United States Patent [19]
Yamazaki et al.

[11] Patent Number: 6,061,352
[45] Date of Patent: May 9, 2000

[54] ATM CELL RECEIVER SYSTEM WITH SOURCE CLOCK RECOVERY

[75] Inventors: Katsuyuki Yamazaki, Tokyo; Shinobu Yagi, Machida; Akito Fukui, Yokohama, all of Japan

[73] Assignees: Matsushita Electric Industrial Co., Ltd., Osaka; Kokusai Denshin Denwa Co., Ltd., Tokyo, both of Japan

[21] Appl. No.: 08/759,879

[22] Filed: Dec. 3, 1996

[30] Foreign Application Priority Data

Dec. 14, 1995 [JP] Japan ................. 7-325360

[51] Int. Cl.⁷ .................. H04L 12/38; H04J 3/06
[52] U.S. Cl. ........................ 370/394; 370/516
[58] Field of Search .................. 370/216, 229, 370/230, 232, 241, 395, 397, 503, 905, 465, 468, 474, 505, 506; 371/5.1, 5.3, 5.4, 21.2, 22.36, 27.7, 38.1, 48; 395/181, 182.8, 183.01

[56] References Cited

U.S. PATENT DOCUMENTS

| | | | |
|---|---|---|---|
| 5,654,962 | 8/1997 | Rostoker et al. | 370/232 |
| 5,657,316 | 8/1997 | Nakagaki et al. | 370/394 |
| 5,774,466 | 6/1998 | Hamamoto et al. | 370/416 |

OTHER PUBLICATIONS

H. Uematsu et al, "CLAD Implementation and Experimental Results in ATM Networks", Institute of Electronics, Information and Communication Engineers Report, B–I, vol. J77–B–I, No. 11. Nov. 1994, pp. 684–694.

*Primary Examiner*—Huy D. Vu
*Assistant Examiner*—Chiho Andrew Lee
*Attorney, Agent, or Firm*—Stevens, Davis, Miller & Mosher, L.L.P.

[57] ABSTRACT

A cell disassemble circuit in a cell receiver system detects the number of lost cells from information for detecting cell loss included in received cells, and separates a payload from a header in each of the received cells. The number of lost cells indicates the number of cells lost on a transmission path from the transmission side to the cell receiver system. A buffer stores the number of detected lost cells and data inserted in the payloads. A phase locked loop recovers a source clock corresponding to the rate of fixed rate information based on a use level of the buffer. A counter circuit generates a clock for reading data from the first buffer from the recovered source clock. Also, the counter circuit stops outputting the read clock to the buffer for a time period corresponding to the number of lost cells.

15 Claims, 7 Drawing Sheets

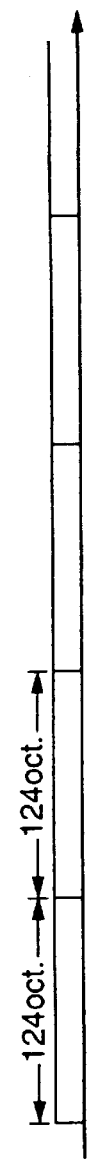
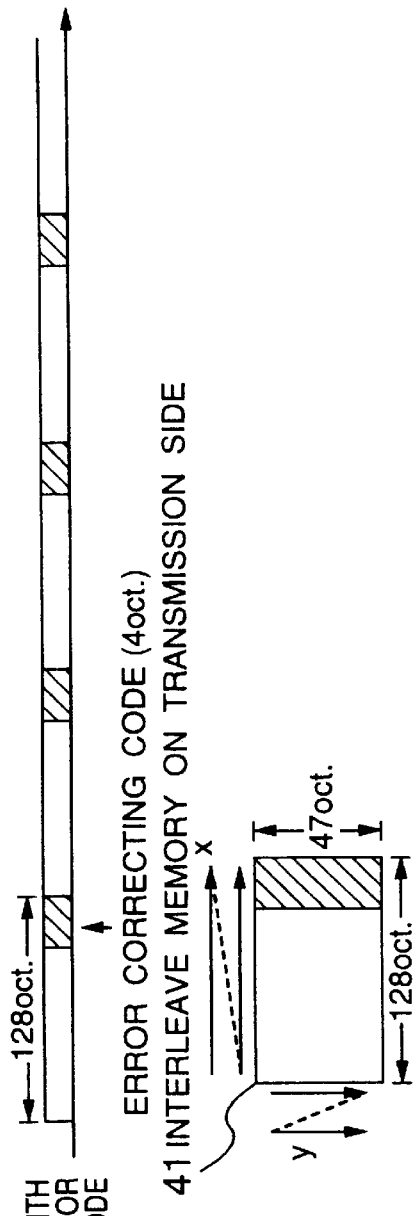
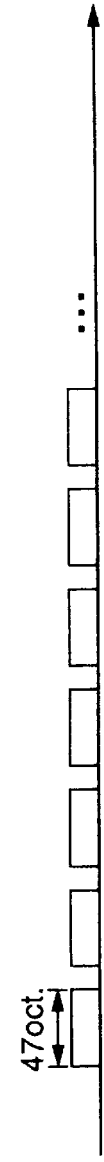
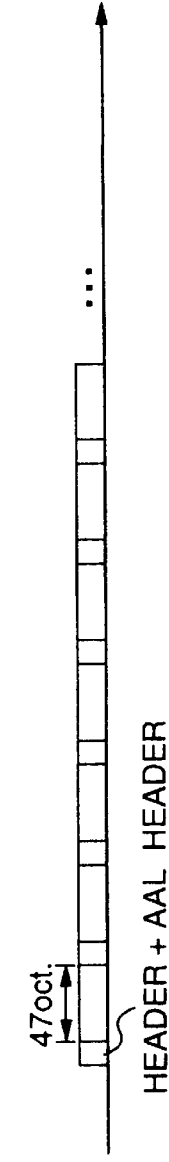
FIG. 2A PRIOR ART — INFORMATION RECEIVED FROM TERMINAL
FIG. 2B PRIOR ART — INFORMATION WITH ADDITIONAL ERROR CORRECTING CODE
FIG. 2C PRIOR ART
FIG. 2D PRIOR ART — EVERY 47 oct. OF DATA
FIG. 2E PRIOR ART — CELL DATA OUTPUTTED FROM CELL TRANSMISSION SIDE

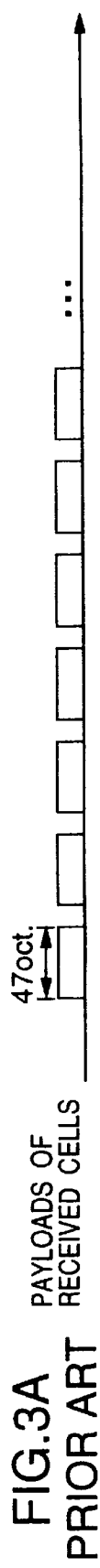
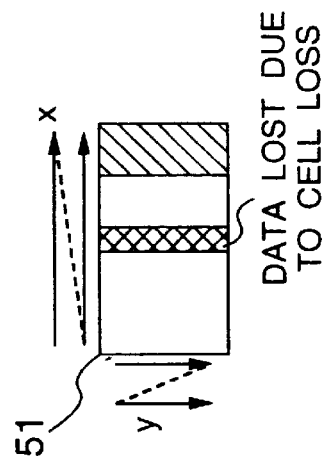
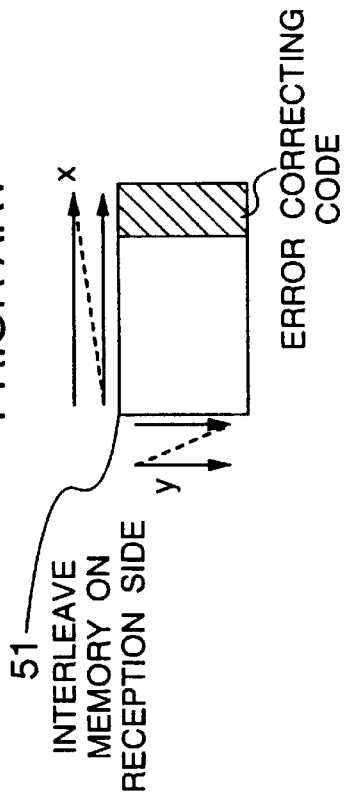
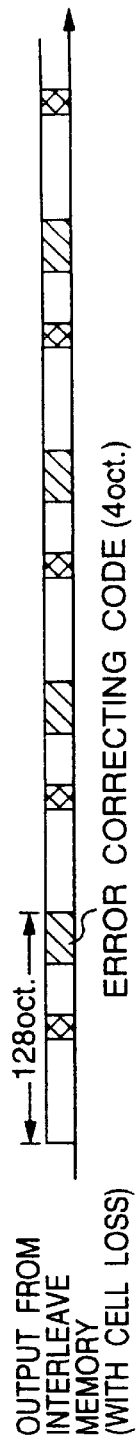
FIG. 3A PRIOR ART
FIG. 3B PRIOR ART
FIG. 3C PRIOR ART
FIG. 3D PRIOR ART
FIG. 3E PRIOR ART

ATM CELL RECEIVER SYSTEM WITH SOURCE CLOCK RECOVERY

BACKGROUND OF THE INVENTION

1. Field of the Invention

The present invention relates generally to a cell receiver system with source clock recovery, and more particularly to an ATM (Asynchronous Transfer Mode) cell receiver system for use in the transmission of information at a fixed rate in an ATM scheme.

2. Description of the Related Art

In an ATM transmission/switching scheme which transmits and switches information in the form of a fixed length packet called a cell, cell loss (lost cells) and bit errors may occur in the course of transmission. For this reason, an error correcting method which combines octet interleave and error correction may be employed for recovering original data from received data which suffers from cell loss and bit errors. In addition, a source clock recovery method may be employed for recovering a source clock at a rate corresponding to a fixed rate information generated on the transmission side (ITU-T (International Telecommunication Union—Telecommunication Standardization Sector) Recommendation I.363).

FIG. 1 illustrates the structure of data in a cell which is handled by a cell receiver system used in an ATM transmission/switching scheme of the type mentioned above. A header 31 (including data of fine octets) contains information indicative of the destination of the cell or the like which, however, is not used in the cell receiver system itself. An AAL (ATM Adaptation Layer) header 32 (including data of one octet) contains information used for detecting cell loss on the reception side. Specifically, a serial number is inserted into the AAL header 32 of the cells on the transmission side. A payload 33 (including data of 47 octets) contains information to be transmitted.

Next, an error correcting method employing a combination of octet interleave and error correction will be explained with reference to FIGS. 2A–2E and 3A–3E.

On the cell transmission side, a 4-octet error correcting code is added to every 124 octets of information received from a terminal to assemble a block having a length of 128 octets, as illustrated in FIGS. 2A and 2B. Data constituting the block having a length of 128 octets are sequentially written into an interleave memory 41 in the transmission side having a size of 128 octets by 47 octets, as illustrated in FIG. 2C, in the x-direction. When the data have been thus written into the interleave memory 41 on the transmission side, the written data are sequentially read therefrom in the y-direction. In this way, octet-interleaved data each having 47 octets are created as illustrated in FIG. 2D. The 47-octet data is inserted into the payload 33 illustrated in FIG. 1. Subsequently, the header 31 and the AAL header 32 are added to the payload 33 to assemble a cell which is transmitted from the cell transmission side to the cell reception side.

On the cell reception side, it is confirmed whether or not any serial number inserted in the AAL header 32 in received cells is missing. If it is confirmed that no serial number is missing, 47-octet data inserted in the payloads 33 of the received cells are sequentially written into an interleave memory 51 on the reception side having a size of 128 octets by 47 octets, as illustrated in FIG. 3B, in the y-direction. On the other hand, if it is confirmed that any serial number is missing, 47-octet data inserted in the payloads 33 of the received cells are sequentially written into the interleave memory 51 on the reception side in the y-direction with a region of the memory 51 reserved for the number of lost (missing) cells, as illustrated in FIG. 3C. When the data have been thus written into the interleave memory 51 on the reception side, the written data are sequentially read therefrom in the x-direction. In this way, data each having 128 octets are created as illustrated in FIGS. 3D and 3E. In FIGS. 3C and 3E, meshed portions represent data lost due to the cell loss. Also, the last four octets of each 128-octet data, indicated by hatching, represent the error correcting code added thereto on the transmission side. This error correcting code is used to recover data lost due to the cell loss.

Assuming, for example, that one cell is lost during transmission, data are written into the interleave memory 51 on the reception side with a region corresponding to one column being reserved in the y-direction. Thus, one octet of data is lost in each of 128-octet data sequentially read from the interleave memory 51 on the reception side in the x-direction. The lost one octet of data is recovered using the error correcting code located in the last four octets of the 128-octet data.

Next, how a source clock is recovered according to an adaptive clock scheme will be explained with reference to FIG. 4. The source clock recovery according to the adaptive clock scheme controls a clock for reading data from a buffer 61 (read clock) with a phase locked loop (PLL) 62 such that data inserted in the payloads 33 of received cells are once written into the buffer 61 while the buffer 61 is used at a constant level. More specifically, when fixed rate information is assembled into cells for transmission on the transmission side, cells are transmitted at regular intervals, so that the rate of the fixed rate information (rate of a source clock) can be recovered on the reception side by controlling the use level of the buffer 61 (i.e. the amount of data stored in the buffer 61) to be constant.

A cell receiver system of the present invention relates to a system which receives cells assembled from fixed rate information and recovers the original fixed rate information, and more particularly, performs the error correction processing and the source clock recovery processing according to the adaptive clock scheme (for example, H. Uematsu et al., "CLAD Implementation and Experimental Results in ATM networks", Institute of Electronics, Information and Communication Engineers Report, B-I, Vol. J77-B-I, No. 11, pp. 684–694, Nov. 1994).

Next, a first prior art example of the cell receiver system of the type mentioned above will be described with reference to FIG. 5. A cell disassemble means 71 in the illustrated cell receiver system processes an AAL header 32 of each of received cells to separate a payload 33 from the cell. A first buffer 72 stores data inserted in the payloads 33 separated by the cell disassemble means 71 to absorb variations in interval between cells due to delay. An interleave memory 73 stores data outputted from the first buffer 72 for octet interleave processing. An error correcting means 74 processes an error correcting code included in data outputted from the interleave memory 73 to correct possible errors in the data outputted from the interleave memory 73. A second buffer 75 stores data outputted from the error correcting means 74 except for the error correcting code for converting the received data to fixed rate data (fixed rate information). A PLL 76 recovers a source clock based on a use level of the first buffer 72. A counter means 77 generates a read clock for the first buffer 72, an operating clock for the interleave memory 73, an operating clock for the error correcting means 74, and a write clock for the second buffer 75, respectively, from the source clock recovered by the PLL 76.

In this cell receiver system, the cell disassemble means 71, after confirming a serial number inserted in the AAL header 32 of each of received cells, separates the payload 33 from the header 31 and the AAL header 32. Data inserted in the separated payload 33 is written into the first buffer 72. The data written into the first buffer 72 is sequentially read therefrom in response to the read clock from the counter means 77 and written into the interleave memory 73 in the y-direction. The data written into the interleave memory 73 is sequentially read therefrom in the x-direction, such that every 128 octets of data are sent to the error correcting means 74. The error correcting means 74 uses the error correcting code included in the 128-octet data sent thereto from the interleave memory 73 to recover data lost due to cell loss and transmission errors. The error correcting means 74 outputs 124-octets of the 128-octet data from which 4-octets of the error correcting code have been removed, and the 124-octet data are written into the second buffer 75. The 124-octet data written into the second buffer 75 are read by the source clock recovered by the PLL 76 to be recovered to the original fixed rate information which is outputted to a terminal.

The PLL 76 recovers the source clock generated on the transmission side based on the use level of the first buffer 72 according to the adaptive clock scheme. However, if an error correcting code or the like is transmitted together with information to be recovered, as is the case of applying an error correcting method to the data transmission, data must be read from the first buffer 72 at a rate higher by a fraction corresponding to the error correcting code than the rate of the recovered source clock. For this reason, the cell receiver system employs the counter means 77 for generating a clock at a rate higher than the source clock recovered by the PLL 76 for allowing for the error correcting code (i.e., source clock×128/124). Assuming, for example, that the source clock on the transmission side is at 1,544 kHz, the PLL 76 recovers the source clock at 1,544 kHz, and the counter means 77 generates a clock at a rate higher than the source clock by a fraction corresponding to the error correcting code (at 1,544×128/124 kHz). It should be noted that the counter means 77 may be implemented by a PLL.

Next, a second prior art example of the cell receiver system of the type mentioned above will be described with reference to FIG. 6. A cell disassemble means 81 in the illustrated cell receiver system processes an AAL header 32 in each of the received cells to separate a payload 33 from the cell. A first buffer 82 stores data inserted in the payloads 33 separated by the cell disassemble means 81 to absorb variations in interval between cells due to delay. An interleave memory 83 stores data outputted from the first buffer 82 to perform octet-interleave processing. An error correcting means 84 processes an error correcting code included in data outputted from the interleave memory 73 to correct possible errors in the data outputted from the interleave memory 73. A second buffer 85 stores data outputted from the error correcting means 74, except for the error correcting code, for converting the received data to fixed rate data (fixed rate information). A first PLL 86 generates a read clock for the first buffer 82, an operating clock for the interleave memory 83, an operating clock for the error correcting means 84, and a write clock for the second buffer 85, respectively. A second PLL 87 recovers a source clock based on a use level of the second buffer 85.

In the cell receiver system mentioned above, the cell disassemble means 81, after confirming a serial number inserted in the AAL header 32 of each of received cells, separates the payload 33 from the header 31 and the AAL header 32. Data inserted in the separated payload 33 is written into the first buffer 82. The data written into the first buffer 82 is sequentially read therefrom in response to the read clock from the first PLL 86 to absorb variations in interval between cells due to delay, and then written into the interleave memory 83 in the y-direction. The data written into the interleave memory 83 is sequentially read therefrom in the x-direction, such that every 128 octets of the data are sent to the error correcting means 84. The error correcting means 84 uses the error correcting code included in the 128-octet data sent thereto from the interleave memory 83 to recover data lost due to cell loss and transmission errors. The error correcting means 84 outputs 124-octets of the 128-octet data from which the 4-octets of the error correcting code have been removed, and the 124-octet data are written into the second buffer 85. The 124-octet data written into the second buffer 85 are read at the rate of the source clock recovered by the second PLL 87 to be recovered to the original fixed rate information which is outputted to a terminal.

If an error correcting code or the like is transmitted together with information to be recovered, as is the case of applying an error correcting method to the data transmission, data must be read from the first buffer 82 at a rate higher by a fraction corresponding to the error correcting code than the rate of the recovered source clock. For this reason, the first PLL 86 generates a clock at a rate higher than the source clock for allowing for the error correcting code based on the use level of the first buffer 82 according to the adaptive clock scheme, such that data is read from the first buffer 82 in response to the thus recovered clock. The second PLL 87 in turn recovers the source clock based on the use level of the second buffer 85. Assuming, for example, that the source clock at the transmission side is at 1,544 kHz, the first PLL 86 recovers a clock at a rate higher than the source clock by a fraction corresponding to the error correcting code (at 1,544×128/124 kHz), and the second PLL 87 recovers a clock at 1,544 kHz which is equal to the source clock.

As described above, the conventional cell receiver systems may also receive cells assembled from fixed rate information and perform the error correction processing and the processing for recovering the source clock according to the adaptive clock scheme to recover the original fixed rate information.

However, the cell receiver system of the first prior art example has a problem that if cell loss occurs in the course of transmission, the use level of the first buffer 72, employed as the basis for recovering the source clock, becomes lower so that the frequency of a recovered source clock is temporarily lowered to cause a larger amount of jitter in the source clock.

On the other hand, the cell receiver system of the second prior art example has a problem that the need for the first PLL 86 for controlling data read from the first buffer 82 for absorbing variations in interval between delays due to delay and the second PLL 87 for recovering the source clock results in increasing its hardware scale.

SUMMARY OF THE INVENTION

It is a first object of the present invention to provide a cell receiver system with source clock recovery which is capable of solving the problem inherent to the cell receiver system of the first prior art example, and specifically, which is capable of reducing the amount of jitter introduced into a recovered source clock even if cell loss occurs in the course of transmission.

It is a second object of the present invention to provide a cell receiver system having a source clock recovery circuit which is capable of solving the problem inherent to the cell receiver system of the second prior art example, and specifically, which is capable of reducing its hardware scale.

To achieve the first object, according to a first configuration of the cell receiver system of the present invention, cell disassemble means writes information indicative of the number of lost cells into a first buffer when cell loss is detected. Also, when counter means reads the information indicative of the number of lost cells from the first buffer, the first buffer is prevented from outputting data for a time period corresponding to the number of lost cells. In this way, according to the first configuration of the cell receiver system of the present invention, a use level of the first buffer, even if cell loss has occurred, can be returned to the same use level presented when cell loss does not occur, thus making it possible to reduce the amount of jitter introduced into a recovered source clock.

To achieve the second object, according to a second configuration of the cell receiver system of the present invention, read timing calculator means for generating a timing for reading data from a first buffer is provided instead of the first PLL (e.g. PLL 86 illustrated in FIG. 6). The read timing calculator means monitors a use level of the first buffer in order to set an interval at which data inserted in payloads are read from the first buffer to a short interval when the use level is higher than a reference level and to a long interval when the use level is lower than the reference level. In this way, according to the second configuration of the cell receiver system of the present invention, since data inserted in payloads can be read from the first buffer while maintaining substantially a constant use level of the first buffer, the same function as the first PLL 86 implemented by an analog circuit can be realized by a digital circuit, thus making it possible to reduce the hardware scale.

Specifically, a cell receiver system according to a first aspect of the present invention comprises means which is operable when cell loss is detected to return the use level of the first buffer for storing the number of detected lost cells and data inserted in payloads to the same use level presented when cell loss does not occur, so that even if cell loss occurs in the course of transmission, the amount of jitter introduced into a reproduced source clock can be reduced.

Also, a cell receiver system according to a second aspect of the present invention is advantageous over a conventional cell receiver system comprising a first PLL for controlling a first buffer for absorbing variations in interval between cells due to delay and a second PLL for controlling a second buffer for recovering a source clock in that a read timing calculator means for generating a timing for reading data from a first buffer is provided instead of the first PLL, so that the first PLL implemented by an analog circuit is eliminated, and accordingly the hardware scale can be reduced.

Further, according to a third aspect of the present invention, a cell receiver system with source clock recovery for receiving cells assembled from fixed rate information to recover the original fixed rate information, comprises cell disassemble means for detecting cell loss from a serial number of each received cell and for separating a payload from the cell, a first buffer for storing the number of lost cells detected by the cell disassemble means and data inserted in the payloads, a second buffer for recovering the fixed rate information, a PLL for recovering a source clock based on a use level of the first buffer, and counter means for generating a timing for reading data from the first buffer from the recovered source clock, wherein when the cell disassemble means detects cell loss, the number of lost cells is written into the first buffer, and when the counter means reads the number of lost cells from the first buffer, the first buffer is prevented from outputting data for a time period corresponding to the number of lost cells to return a use level of the first buffer to the same use level when cell loss does not occur, thus recovering a source clock with a reduced amount of jitter. It is therefore possible to reduce the amount of jitter introduced into the recovered source clock even if cell loss has occurred in the course of transmission.

Further, according to a fourth aspect of the present invention, a cell receiver system with source clock recover for receiving cells assembled from fixed rate information to recover the original fixed rate information, comprises cell disassemble means for separating a payload from each of the received cells, a first buffer for storing data inserted in the payloads to absorb variations in interval between cells due to delay, a second buffer for recovering fixed rate information, read timing calculator means for generating a timing for reading data from the first buffer, and a PLL for recovering a source clock based on a use level of the second buffer, wherein the read timing calculator means monitors a use level of the first buffer to set an interval at which the data inserted in the payloads are read from the first buffer to a short interval when the use level is higher than a reference level, and to a long interval when the use level is lower than the reference level, thus reading the data inserted in the payloads while maintaining substantially a constant use level of the first buffer. It is therefore possible to eliminate the first PLL implemented by an analog circuit in the prior art and accordingly reduce the hardware scale of the cell receiver system.

BRIEF DESCRIPTION OF THE DRAWINGS

FIGS. 2A–2E are diagrams for explaining an error correcting method;

FIGS. 3A–3E are diagrams for explaining the error correcting method;

DESCRIPTION OF THE PREFERRED EMBODIMENTS

Figure 7:
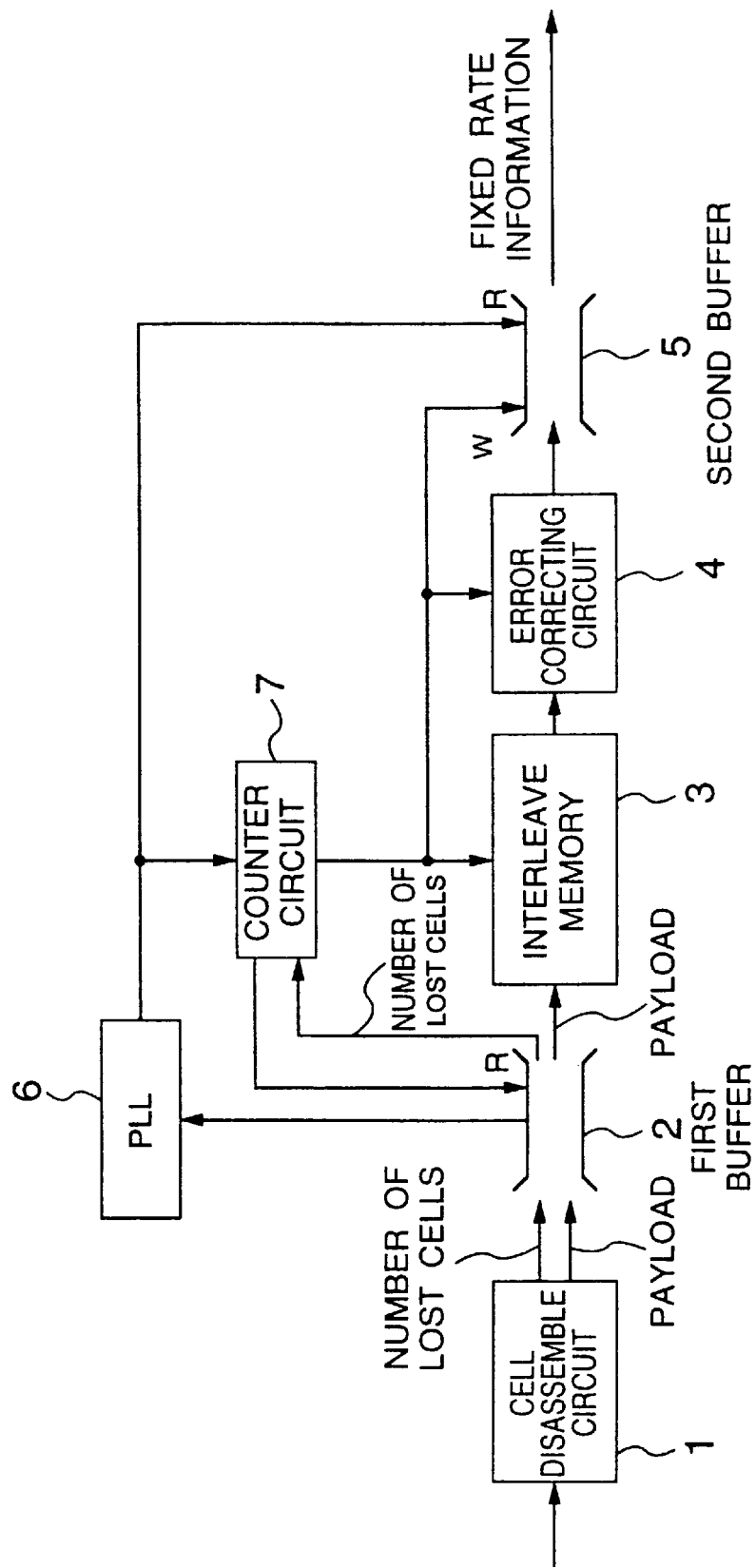
FIG. 7 is a block diagram illustrating a cell receiver system with source clock recovery according to a first embodiment of the present invention.

A cell receiver system according to a first embodiment of the present invention, as illustrated in FIG. 7, includes a cell disassemble circuit 1; a first buffer 2; an interleave memory 3; an error correcting circuit 4; a second buffer 5; a PLL 6; and a counter circuit 6.

The cell disassemble circuit 1 processes an AAL header 32 in each of the received cells to detect the number of lost cells and separates a payload 33 from each cell. The first buffer 2 stores data inserted in the payloads 33 separated by the cell disassemble circuit 1 to absorb variations in interval between cells due to delay and stores the number of lost cells detected by the cell disassemble circuit 1. The interleave memory 3 stores data outputted from the first buffer 2 to perform octet interleave processing. The error correcting circuit 4 processes an error correcting code included in data outputted from the interleave memory 3 to correct possible errors in the data outputted from the interleave memory 3. The second buffer 5 stores data outputted from the error correcting circuit 4 except for the error correcting code and converts the data to fixed rate data (fixed rate information). The PLL 6 recovers a source clock based on a use level of the first buffer 2. The counter circuit 7 generates a read clock for the first buffer 2, an operating clock for the interleave memory 3, an operating clock for the error correcting circuit 4, and a write clock for the second buffer 5, respectively, from the source clock recovered by the PLL 6.

In the cell receiver system according to the first embodiment, the cell disassemble circuit 1 confirms the presence or absence of cell loss from a serial number inserted in the AAL header 32 of the respective cells to detect the number of lost cells, and separates the payload 33 from a header 31 and the AAL header 32. Data inserted in the respective separated payloads 33 are written into the first buffer 2. Also, when the number of lost cells is detected by the cell disassemble circuit 1, information indicative of the number of detected lost cells is written into the first buffer 2. The data written into the first buffer 2 are sequentially read therefrom in response to the read clock from the counter circuit 7, and sequentially written into the interleave memory 3 in the y-direction. The data written into the interleave memory 3 are sequentially read therefrom in the x-direction such that every 128 octets of data are sent to the error correcting circuit 4. The error correcting circuit 4 uses an error correcting code included in 128-octet data sent thereto from the interleave memory 3 to recover data lost due to cell loss and transmission errors. The error correcting circuit 4 outputs 124 octets of the 128-octet data from which four octets of the error correcting code have been removed, and the 124-octet data are written into the second buffer 5. Then, the 124-octet data are read from the second buffer 5 in response to the source clock recovered by the PLL 6, so that original fixed rate information is recovered and outputted to a terminal.

The PLL 6 recovers the source clock generated on the transmission side based on the use level of the first buffer 2 according to the adaptive clock scheme. However, if an error correcting code or the like is transmitted together with information to be recovered, as is the case of applying an error correcting method to the data transmission, data must be read from the first buffer 2 at a rate higher by a fraction corresponding to the error correcting code than the rate of the recovered source clock. For this reason, the cell receiver system of the first embodiment also employs the counter circuit 7 for generating a clock at a rate higher than the source clock recovered by the PLL 6 for allowing for the error correcting code (i.e., source clock×128/124). Assuming, for example, that the source clock on the transmission side is at 1,544 kHz, the PLL 6 recovers the source clock at 1,544 kHz, and the counter circuit 7 generates a clock at a rate higher than the source clock by a fraction corresponding to the error correcting code (at 1,544×128/124 kHz).

The counter circuit 7, when reading information from first buffer 2 indicative of the number of lost cells, stops outputting the read clock to the first buffer 2 for a time period corresponding to the number of lost cells indicated by this read information. In this way, since data written into the first buffer 2 is prevented from being read for the time period corresponding to the number of lost cells, the use level of the first buffer 2, even if cell loss has occurred, can be returned to the same use level presented when cell loss does not occur. It is therefore possible, according to the cell receiver system of the first embodiment, to reduce the amount of jitter introduced into the source clock recovered by the PLL 6.

It should be noted that while the processing for the error correcting method is performed in the cell receiver system described above, processing other than that for the error correcting method may be performed in the interleave memory 3 and the error correcting circuit 4, and also, the processing for the error correcting method may not be performed.

Figure 8:
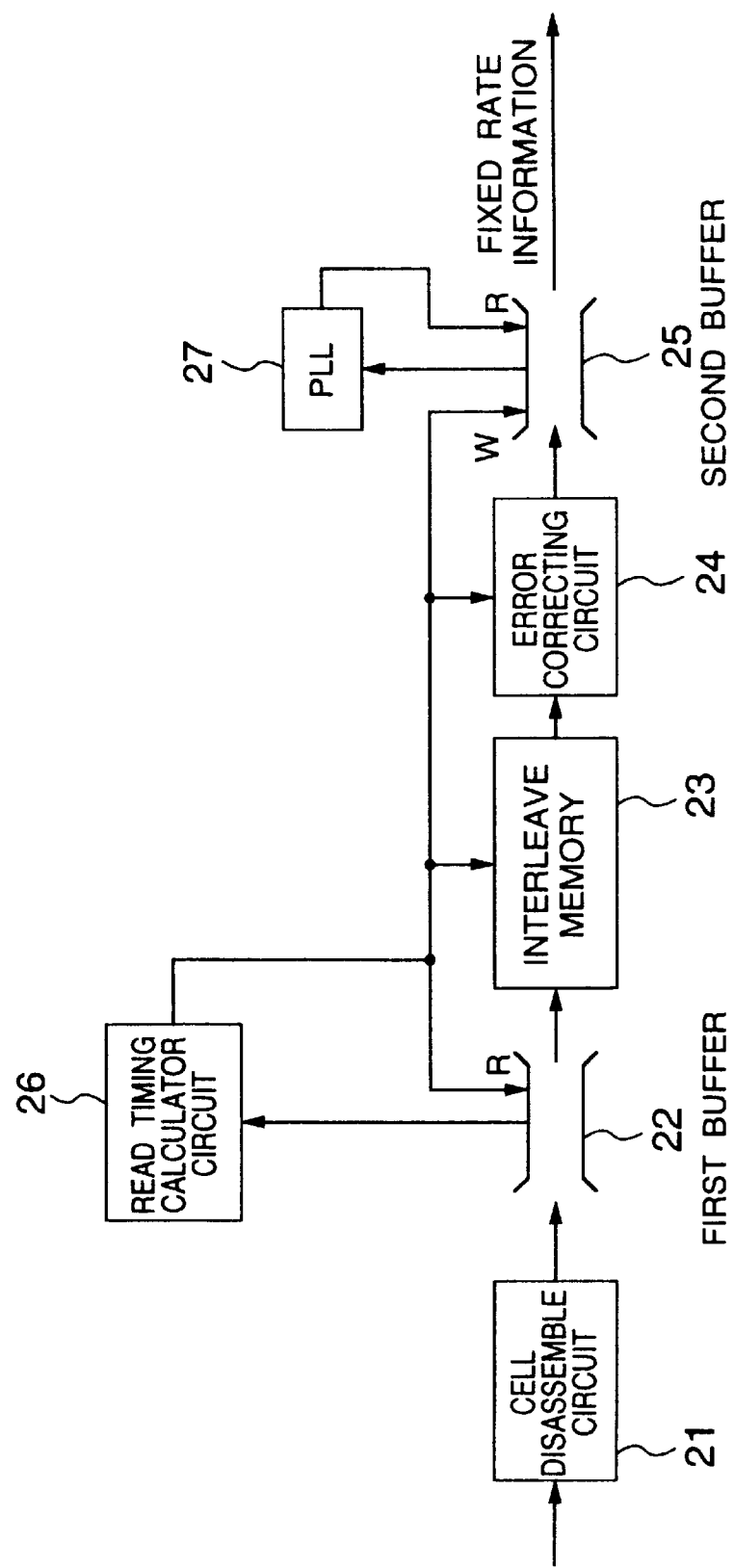
FIG. 8 is a block diagram illustrating a cell receiver system with source clock recovery according to a second embodiment of the present invention.

Next, a cell receiver system according to a second embodiment of the present invention, as illustrated in FIG. 8, includes a cell disassemble circuit 21; a first buffer 22; an interleave memory 23; an error correcting circuit 24; a second buffer 25; a read timing calculator circuit 26; and a PLL 27.

The cell disassemble circuit 21 processes an AAL header 32 in each of received cells to separate a payload 33 from the cell. The first buffer 22 stores data inserted in the respective payloads 33 separated by the cell disassemble circuit 21 to absorb variations in interval between cells due to delay. The interleave memory 23 stores data outputted from the first buffer 22 to perform octet interleave processing. The error correcting circuit 24 processes an error correcting code included in data outputted from the interleave memory 23 to correct possible errors in the data outputted from the interleave memory 23. The second buffer 25 stores data outputted from the error correcting circuit 24 except for the error correcting code and converts the data to fixed rate data (fixed rate information). The read timing calculator circuit 26 generates a read timing signal used for reading the data inserted in the payloads 33 from the first buffer 22, an operating clock for the interleave memory 23, an operating clock for the error correcting circuit 24, and a write clock for the second buffer 25, respectively, based on a use level of the first buffer 22. The PLL 27 recovers a source clock based on a use level of the second buffer 25.

In the cell receiver system according to the second embodiment, after confirming a serial number inserted in the AAL header 32 of each of the received cells, the cell disassemble circuit 21 separates the payload 33 from a header 31 and the AAL header 32. Data inserted in the respective separated payloads 33 are written into the first buffer 22. The data written into the first buffer 22 are sequentially read therefrom in response to the read timing signal from the read timing calculator circuit 26 to absorb variations in the interval between cells due to delay, and then are sequentially written into the interleave memory 23 in the y-direction. The data written into the interleave memory 23 are sequentially read therefrom in the x-direction such that every 128 octets of data are sent to the error correcting circuit 24. The error correcting circuit 24 uses an error correcting code included in the 128-octet data sent thereto from the interleave memory 23 to recover data possibly lost due to cell loss and transmission errors. The error correcting circuit 24 outputs 124 octets of the 128-octet data from which four octets of the error correcting code have been removed, and the 124-octet data are written into the second buffer 5. The 124 octets of data written into the second buffer 25 are read at the rate of a source clock recovered by the PLL 27, so that original fixed rate information is recovered and outputted to a terminal.

The read timing calculator circuit 26 monitors the use level of the first buffer 22 to set an interval at which data inserted in the payloads 33 are read from the first buffer 22 to a short interval (Bs) when the use level (B) is equal to or higher than a reference level (Bt), and to a long interval (Bl) when the use level (B) is lower than the reference level (Bt), whereby the data are read from the first buffer 22 while maintaining substantially a constant use level of the first buffer 22.

Assuming, for example, that fixed rate information assembled into cells is transmitted at a rate of 1,544 kbits/s and the processing for an error correcting method is performed, the interval of cells outputted from the transmission side is calculated to be approximately 83.3 cell-time (when the rate of a transmission path is at 149.76 Mbits/s). Thus, the read timing calculator circuit 26 may set Bs to 83 and Bl to 84 in order to read data inserted in the payloads 33 from the first buffer 22 while maintaining substantially a constant use level of the first buffer 22.

Figure 1:
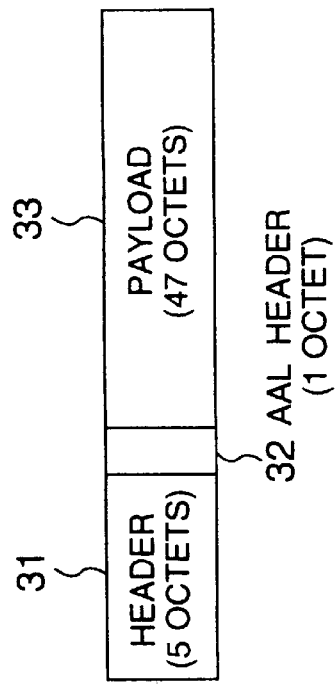
FIG. 1 is a diagram illustrating the structure of a cell handled by a cell receiver system which is an object of the present invention.
Figure 4:
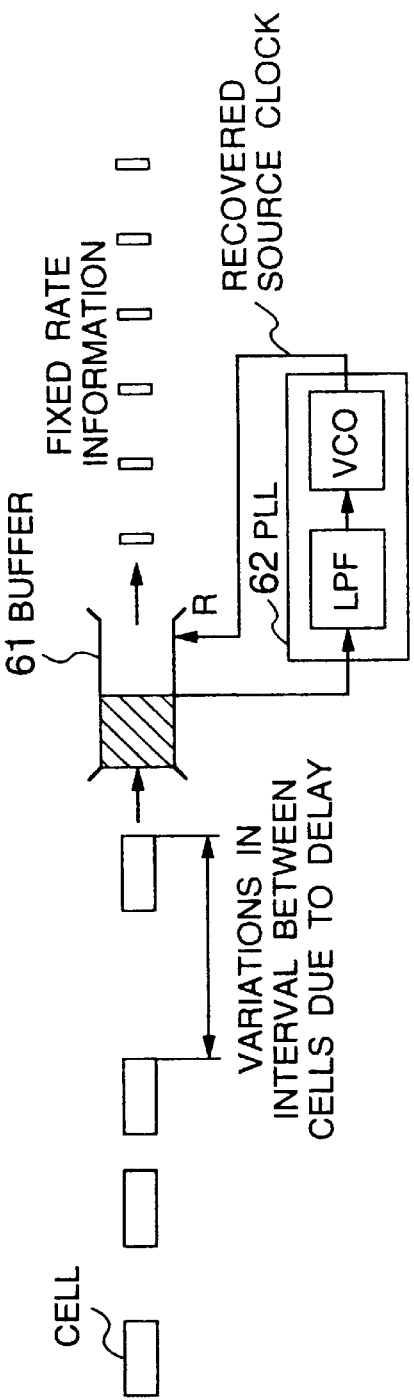
FIG. 4 is a diagram for explaining a source clock recovery method according to an adaptive clock scheme.
Figure 5:
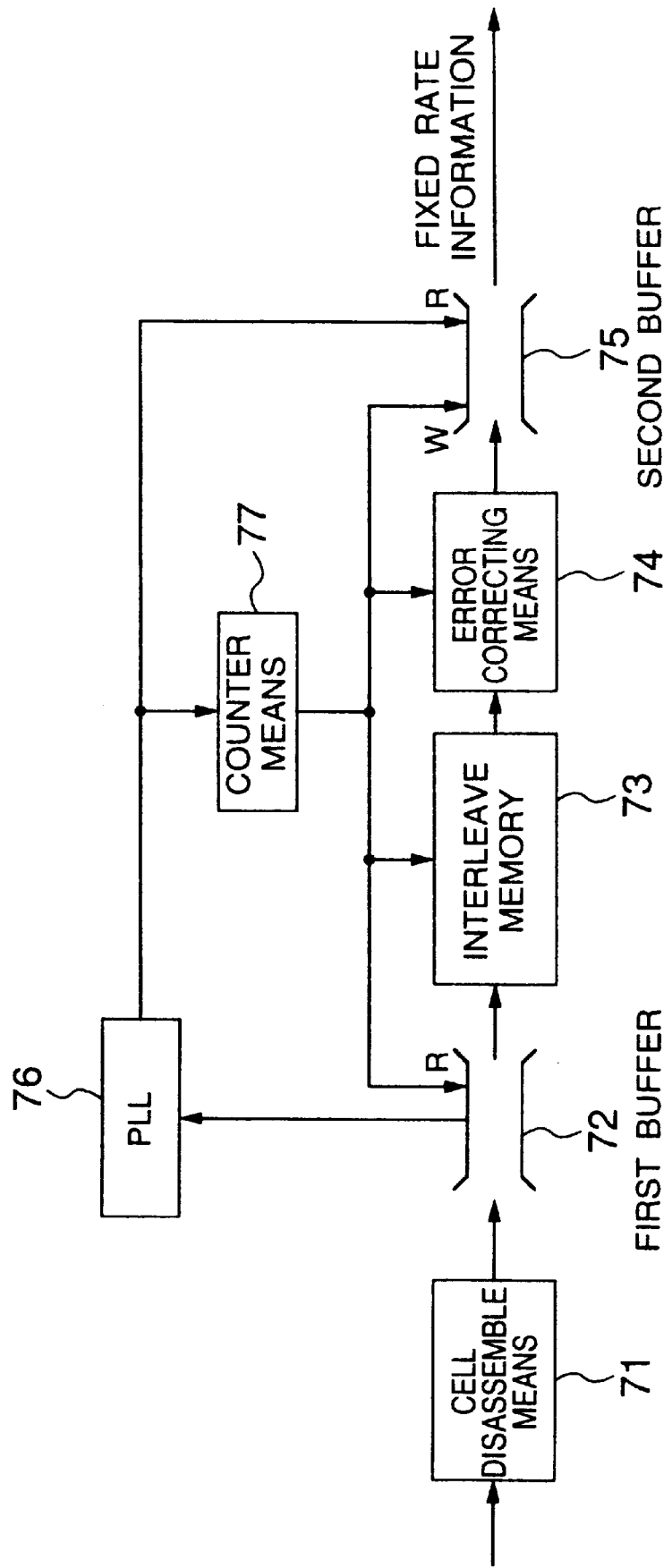
FIG. 5 is a block diagram illustrating a cell receiver system with source clock recovery according to a first prior art example.
Figure 6:
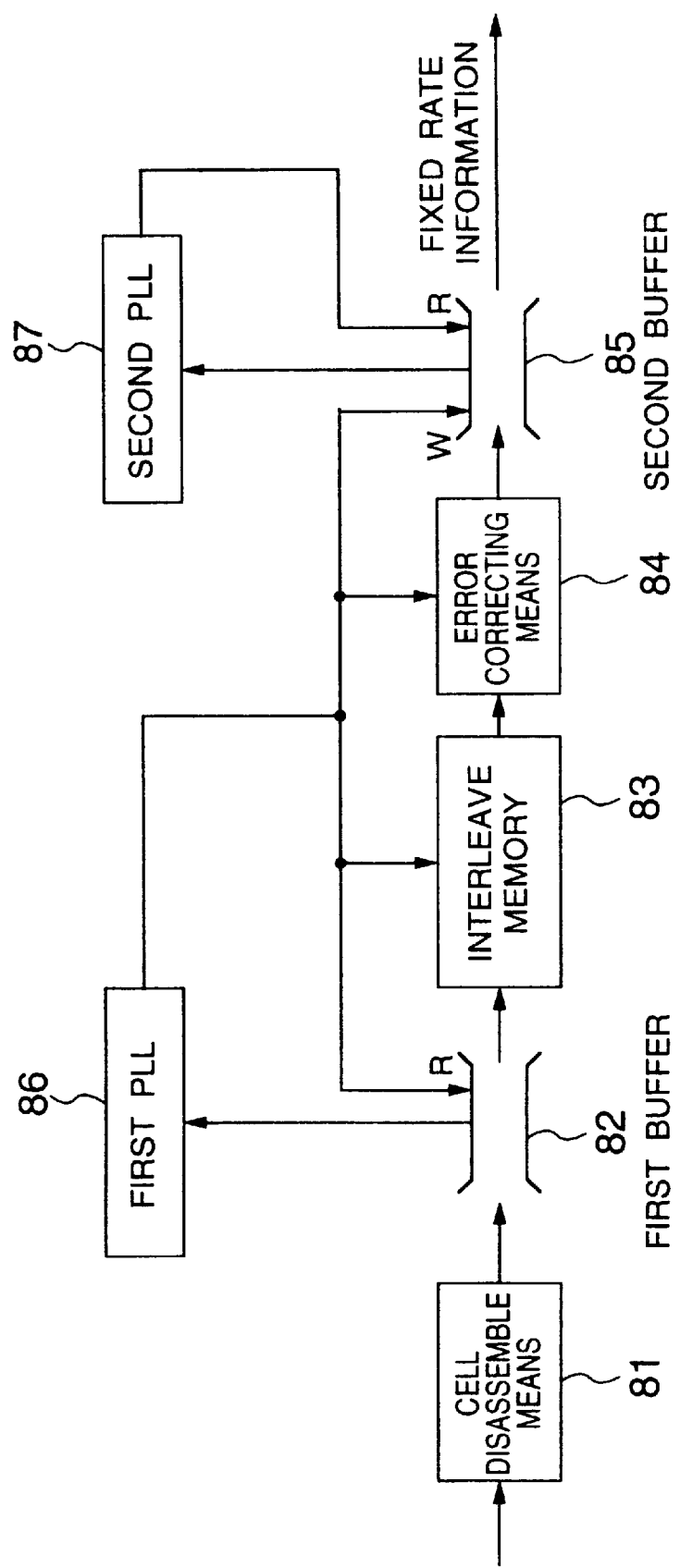
FIG. 6 is a block diagram illustrating a cell receiver system with source clock recovery according to a second prior art example.

In addition, since the read timing calculator circuit 26 can be implemented by a digital circuit, its hardware scale can be reduced as compared with the first PLL 86 illustrated in FIG. 6 which is an analog circuit.

What is claimed is:

1. A cell receiver system with source clock recovery for receiving cells assembled from fixed rate information on a transmission side to recover said fixed rate information from said received cells, comprising:

means for detecting the number of lost cells with respect to said received cells;

a buffer for storing the detected number of lost cells and data inserted in payloads constituting said received cells; and means for reading said detected number of lost cells stored in said buffer to maintain a constant use level of said buffer independently of variations in the number of lost cells.

2. A cell receiver system with source clock recovery for receiving cells assembled from fixed rate information on a transmission side to recover said fixed rate information from said received cells, comprising:

a first buffer for storing data inserted in payloads constituting said cells;

read timing calculator means for monitoring a use level of said first buffer to generate a read clock for reading said data from said first buffer while maintaining a constant use level of said first buffer;

a second buffer for converting, in response to said read clock, data read from said first buffer to said fixed rate information; and a PLL for recovering a source clock based on a use level of said second buffer, with said source clock being input to said second buffer.

3. A cell receiver system with source clock recovery for receiving cells assembled from fixed rate information to recover said original fixed rate information, comprising:

cell disassemble means for detecting cell loss from a serial number of each received cell and for separating a payload from said cell;

a first buffer for storing the number of lost cells detected by said cell disassemble means and data inserted in the payloads;

a second buffer for recovering the fixed rate information;

a PLL for recovering a source clock based on a use level of said first buffer; and counter means for generating a timing for reading data from said first buffer from the recovered source clock, wherein when said cell disassemble means detects cell loss, the number of lost cells is written into said first buffer, and when said counter means reads the number of lost cells from said first buffer, said first buffer is prevented from outputting data for a time period corresponding to the number of lost cells to return a use level of said first buffer to the same use level as when cell loss does not occur, thus recovering a source clock with a reduced amount of jitter.

4. A cell receiver system with source clock recovery for receiving cells assembled from fixed rate information to recover the original fixed rate information, comprising:

cell disassemble means for separating a payload from each of received cells;

a first buffer for storing data inserted in the payloads to absorb variations in interval between the cells due to delay;

a second buffer for recovering fixed rate information;

read timing calculator means for generating a timing for reading data from said first buffer; and a PLL for recovering a source clock based on a use level of said second buffer, wherein said read timing calculator means monitors a use level of said first buffer to set an interval at which the data inserted in the payloads are read from said first buffer to a short interval when said use level is equal to or higher than a reference level, and to a long interval when said use level is lower than the reference level, thus reading the data inserted in the payloads while maintaining a constant use level of the first buffer.

5. A cell receiver system with source clock recovery for receiving cells transmitted thereto from a transmission side to recover fixed rate information from said received cells, each of said cells having a header in which information for detecting cell loss is inserted and a payload in which fixed rate information is inserted, said cell receiver system comprising:

cell disassemble means for detecting the number of lost cells from said information for detecting cell loss included in said received cells and for separating said payload from said header, said number of lost cells indicating the number of cells lost on a transmission path from said transmission side to said cell receiver system;

a first buffer for storing said number of detected lost cells and data inserted in said payloads;

a phase locked loop for recovering a source clock corresponding to a rate of said fixed rate information based on a use level of said first buffer; and counter means for generating a clock for reading data from said first buffer from said recovered source clock;

wherein said counter means stops outputting said read clock to said first buffer for a time period corresponding to said number of lost cells.

6. A cell receiver system according to claim 5, wherein said information for detecting cell loss is a serial number.

7. A cell receiver system according to claim 5, further comprising another buffer for recovering said fixed rate information from data read from said first buffer in response to said read clock.

8. A cell receiver system according to claim 7, wherein said information for detecting cell loss is a serial number.

9. A cell receiver system according to claim 5, further comprising:

error correcting means for correcting errors in data read from said first buffer in response to said read clock; and another buffer for recovering said fixed rate information from data which has undergone said error correction.

10. A cell receiver system according to claim 9, wherein said information for detecting cell loss is a serial number.

11. A cell recovery system with source clock recovery for receiving cells transmitted from a transmission side to recover said fixed rate information from said received cells, each of said cells having a payload in which fixed rate information is inserted, said cell recovery system comprising:

cell disassemble means for separating said payload from each of said received cells;

a first buffer for storing data inserted in said separated payload;

read timing calculator means for generating a read timing signal used for reading said data from said first buffer;

a second buffer for recovering said fixed rate information from data read from said first buffer in response to said read timing signal; and a phase locked loop for recovering a source clock corresponding to a rate of said fixed rate information based on a use level of said second buffer, wherein said read timing calculator means:

monitors a use level of said first buffer;

generates said read timing signal so as to reduce an interval at which said data are read from said first buffer, when the use level of said first buffer is equal to or higher than a reference level; and generates said read timing signal so as to extend the interval at which said data are read from said first buffer, when the use level of said first buffer is lower than the reference level.

12. A cell receiver system according to claim 11, wherein said read timing calculator means is formed by a digital circuit.

13. A cell receiver system according to claim 11, further comprising error correcting means arranged between said first buffer and said second buffer for correcting errors in data read from said first buffer in response to said read timing signal.

14. A cell receiver system according to claim 13, wherein said read timing calculator means is formed by a digital circuit.

15. A cell receiver system according to claim 1, wherein said means for reading includes a counter for reading said number stored in said buffer.

* * * * *